United States Patent
Gonzalez et al.

(10) Patent No.: US 7,490,308 B2
(45) Date of Patent: Feb. 10, 2009

(54) METHOD FOR IMPLEMENTING OVERLAY-BASED MODIFICATION OF VLSI DESIGN LAYOUT

(75) Inventors: Christopher J. Gonzalez, Elmsford, NY (US); Michael S. Gray, Fairfax, VT (US); Matthew T. Guzowski, Essex Junction, VT (US); Jason D. Hibbeler, Williston, VT (US); Stephen I. Runyon, Pflugerville, TX (US); Xiaoyun K. Wu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 11/278,162

(22) Filed: Mar. 31, 2006

(65) Prior Publication Data
US 2007/0234260 A1    Oct. 4, 2007

(51) Int. Cl.
*G06F 17/50* (2006.01)
(52) U.S. Cl. ............................................. 716/10; 716/2
(58) Field of Classification Search ..................... 716/2, 716/10, 19–21
See application file for complete search history.

(56) References Cited

U.S. PATENT DOCUMENTS

| | | | |
|---|---|---|---|
| 6,189,132 B1 | 2/2001 | Heng et al. | 716/11 |
| 6,807,663 B2* | 10/2004 | Cote et al. | 716/21 |
| 6,901,574 B2* | 5/2005 | LaCour et al. | 716/19 |
| 6,941,528 B2 | 9/2005 | Allen et al. | 716/2 |
| 7,089,512 B2* | 8/2006 | Iadanza et al. | 716/4 |
| 2002/0157068 A1* | 10/2002 | LaCour et al. | 716/3 |
| 2002/0194575 A1* | 12/2002 | Allen et al. | 716/17 |
| 2003/0018948 A1* | 1/2003 | Chang et al. | 716/8 |
| 2006/0143589 A1* | 6/2006 | Horng et al. | 716/19 |
| 2006/0266243 A1* | 11/2006 | Percin et al. | 101/484 |
| 2007/0083846 A1* | 4/2007 | Chuang et al. | 716/19 |
| 2007/0101306 A1* | 5/2007 | Bowers et al. | 716/10 |

* cited by examiner

*Primary Examiner*—Stacy A Whitmore
(74) *Attorney, Agent, or Firm*—Cantor Colburn LLP; Richard Kotulak

(57) ABSTRACT

A method of modifying a VLSI layout for performance optimization includes defining a revised set of ground rules for a plurality of original device shapes to be modified and flattening the plurality of original device shapes to a prime cell. A layout optimization operation is performed on the flattened device shapes, based on the revised set of ground rules, so as to create a plurality of revised device shapes. An overlay cell is then created from a difference between the revised device shapes and the original device shapes.

6 Claims, 3 Drawing Sheets

METHOD FOR IMPLEMENTING OVERLAY-BASED MODIFICATION OF VLSI DESIGN LAYOUT

BACKGROUND

The present invention relates generally to layouts in very large scale integrated (VLSI) circuits and, more particularly, to a method for implementing overlay-based modification of VLSI design layouts.

It is sometimes desirable to modify the final layout of a completed VLSI physical design to obtain better yield and/or electrical performance. For instance, in complementary metal oxide semiconductor (CMOS) devices having n-type and p-type transistors, it has been discovered that the conductivity (and hence performance) of each type of transistor is improved when layers of opposing mechanical stress (e.g., compressive versus tensile) are formed over each. In order to form "strained silicon" layers of this type, ground rule changes may be needed for certain geometric features such as the amount of overlap of doped well regions with respect to diffusion regions or with respect to gate contact regions, for example.

In situations where such layout modifications are done late in the design cycle, these modifications should be implemented in a low-risk fashion, and as unobtrusively as possible. On one hand, the manual modification of layouts is very time consuming. In addition, changes to library cells that are used many hundreds or even thousands of times must be made in such a way that the modified cell is still ground-rule correct in every environment in which the cell is used. Also, it is often not possible to modify library cells late in the design cycle. As a result, there is presently little benefit to be gained by optimizing shapes in situ.

Accordingly, it would be desirable to be able to implement layout modifications for a cell in a manner that is independent of the specific uses for such a cell, that allows for the original layout data to be unchanged, and that is substantially invisible with respect to the design tools used in the process flow.

SUMMARY

The foregoing discussed drawbacks and deficiencies of the prior art are overcome or alleviated by a method of modifying a VLSI layout for yield and/or performance optimization. In an exemplary embodiment, the method includes defining a revised set of ground rules for a plurality of original device shapes to be modified and flattening the plurality of original device shapes to a prime cell. A layout optimization operation is performed on the flattened device shapes, based on the revised set of ground rules, so as to create a plurality of revised device shapes. An overlay cell is then created from a difference between the revised device shapes and the original device shapes.

In another embodiment, an overlay cell for use in conjunction with a semiconductor mask includes an ADD layer comprising a first plurality of shapes to be added to the layout of the semiconductor mask and a HOLE layer comprising a second plurality of shapes to be subtracted from the layout of the semiconductor mask. The ADD and HOLE layers represent geometric differences between original shapes formed on the semiconductor mask and revised shapes to be patterned on a wafer in accordance with desired design changes.

In still another embodiment, a storage medium includes a machine readable computer program code for modifying a VLSI layout for yield and/or performance optimization, and instructions for causing a computer to implement a method.

The method further includes flattening a plurality of original device shapes to be modified to a prime cell, and performing a layout optimization operation on the flattened device shapes, based on a revised set of ground rules, so as to create a plurality of revised device shapes. The created revised device shapes facilitate the creation of an overlay cell from a difference between the revised device shapes and the original device shapes.

BRIEF DESCRIPTION OF THE DRAWINGS

Referring to the exemplary drawings wherein like elements are numbered alike in the several Figures.

DETAILED DESCRIPTION

Disclosed herein is a method for modifying a VLSI design layer for yield and/or device performance optimization. Briefly stated, an overlay cell containing layout changes is generated, based upon a comparison between revised device shapes and original device shapes. As used herein, "device shapes" broadly refers to any of the various general features (e.g., transistors, metal layers, insulating layers, etc.) that may be formed on an integrated circuit device. The revised shapes are the result of an optimization process formed on a flattened version of the original device shapes, based upon newly defined ground rules targeted toward the desired device improvement. Moreover, such layout revisions are placed on a layer "invisible" to existing tools in the design flow but can nevertheless be used in the creation of selected masks.

Figure 1:
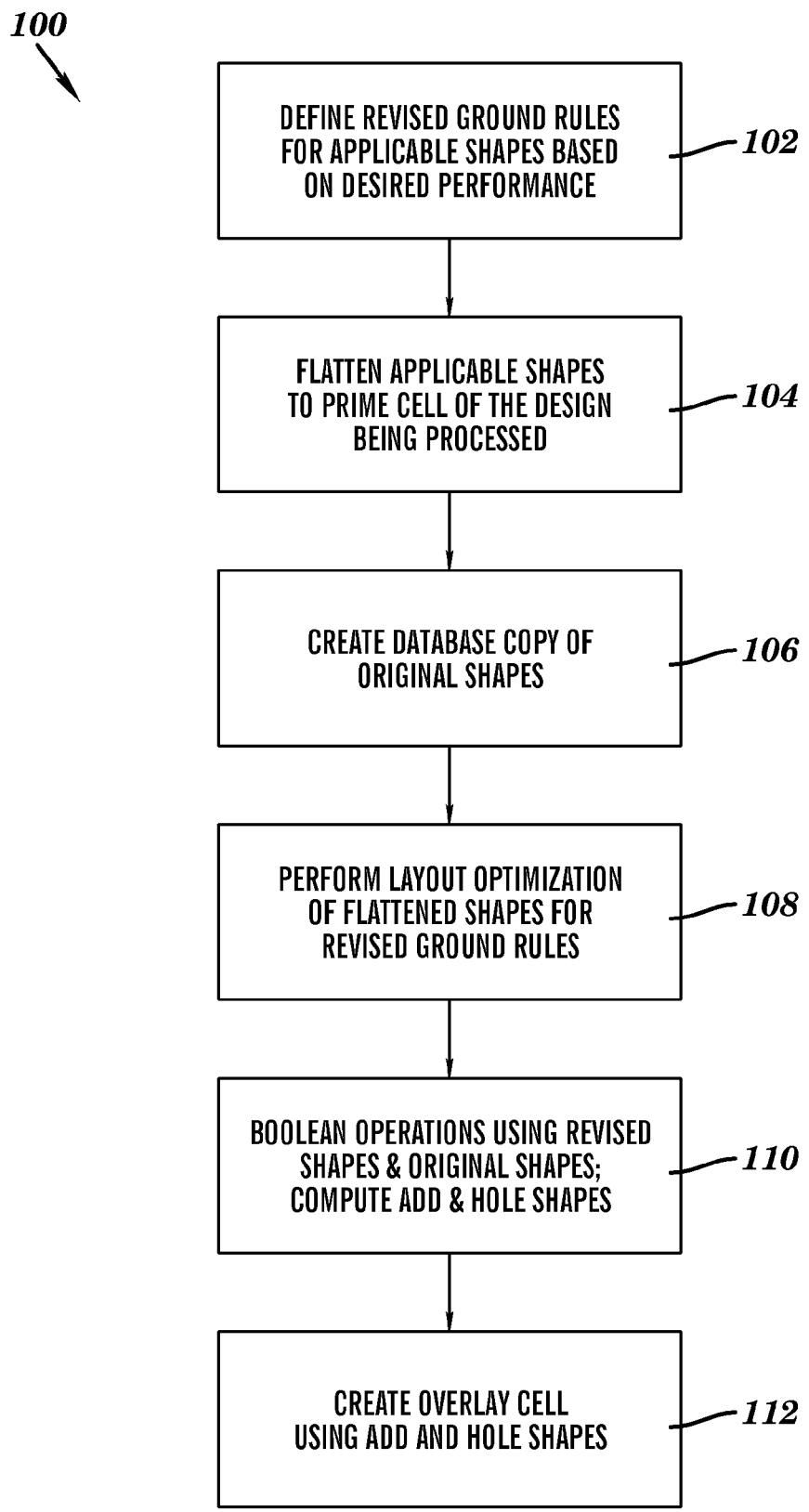
FIG. 1 is a process flow diagram illustrating a method for implementing overlay-based modification of VLSI design layouts, in accordance with an embodiment of the invention.

Referring initially to FIG. 1, there is shown a process flow diagram illustrating a method 100 for implementing overlay-based modification of VLSI design layouts, in accordance with an embodiment of the invention. Beginning in block 102, revised ground rules are defined for applicable device shapes, based on certain performance improvements sought to be achieved over the existing design. In continuing with the example cited above (improved conductivity of CMOS devices through application of tensile/compressive stress layers over selected transistor devices), such revised ground rules may include, for example, expanding the overlap of a doped well region with respect to a gate structure in one direction while reducing the overlap in another direction.

Once the revised ground rules are defined, the original device shapes are flattened as shown in block 104. This flattening is done at a convenient level of design hierarchy (macro, for example), and allows for a given shape of a cell to be modified independently with respect to a corresponding shape used in a different placement of the cell in which the original shapes appear. In addition, a copy of the original design shapes is made (e.g., in an appropriate shape-containing database) for later comparison with modified shapes. This is illustrated in block 106, although it will be appreciated that the copy of the original shapes can be made prior to flattening, or even prior to definition of the modified design rules.

Then, as shown in block 108, a layout optimization of the flattened shapes is performed in accordance with the revised ground rules defined in block 102. This results in a set of revised shapes intended to realize the desired performance improvements over the original layout. The optimization itself may be implemented through any suitable means, such as, for example, the design rule correction method disclosed in U.S. Pat. No. 6,189,132 to Heng, et al., the contents of which are incorporated herein by reference in their entirety.

Using the differences between the revised (optimized flattened) shapes and the original shapes, an overlay cell may be created. In an exemplary embodiment, the differences are obtained through geometric, shape-wise Boolean operations (block 110) that create an "ADD" layer representing the difference between the revised shapes and the original shapes. Correspondingly, a "HOLE" layer is created by taking the difference between the original shapes and the revised shapes. Together, the ADD and HOLE layers are used to create an overlay cell as shown in block 112.

Thus configured, the modifications introduced through the new overlay cell (or cells depending on the number of masks to be modified in accordance with the desired performance changes) are transparent with respect to any of the tools that may be used for performing analysis on the modified layout (e.g., extraction, ground-rule checking, LVS). On the other hand, the mask-building step for the masks in question can make use of the optimized shapes by again using Boolean shape operations and by using special checking decks that also perform the Boolean operations. For design-analysis tools that do need to see the modified shapes as they will be printed on the wafer, the ADD and HOLE overlay shapes can be combined with the original shapes to produce the final modified shapes for analysis.

Figure 2:
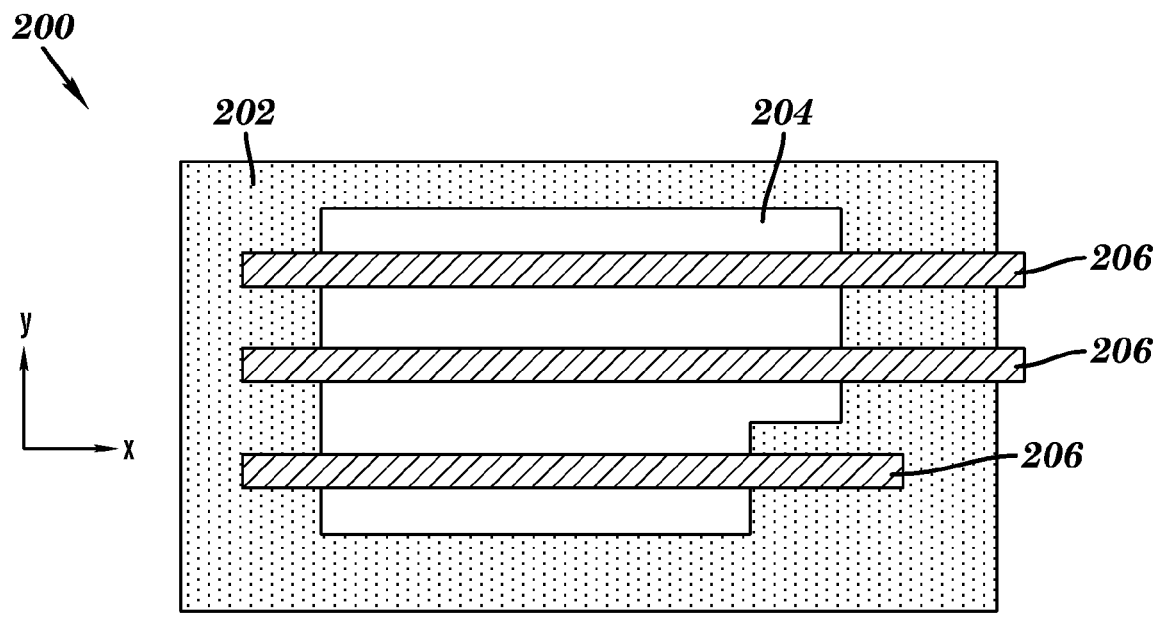
FIG. 2 is a portion of an exemplary layout to be modified in accordance with the method illustrated in FIG. 1.

FIGS. 2 through 5 illustrate a simplified example of the layout modification methodology described above. In particular, FIG. 2 is a layout 200 of a device prior to the desired design modifications. In the simplified example illustrated, shape 202 represents a doped well region, while shape 204 represents diffusion regions that are used to form, for example, source and drain regions of MOS transistors. In addition, shapes 206 represent the gate structures of the transistors. To further the purposes of design improvement in the present example, it is desired to increase the overlap of the well region (i.e., shape 202) in the y-direction while decreasing the overlap of the well region in the x-direction. In other words, the change to be applied to shape 202 is the result of the revised ground rules based on the desired performance, as outlined in block 102 of FIG. 1.

Figure 3:
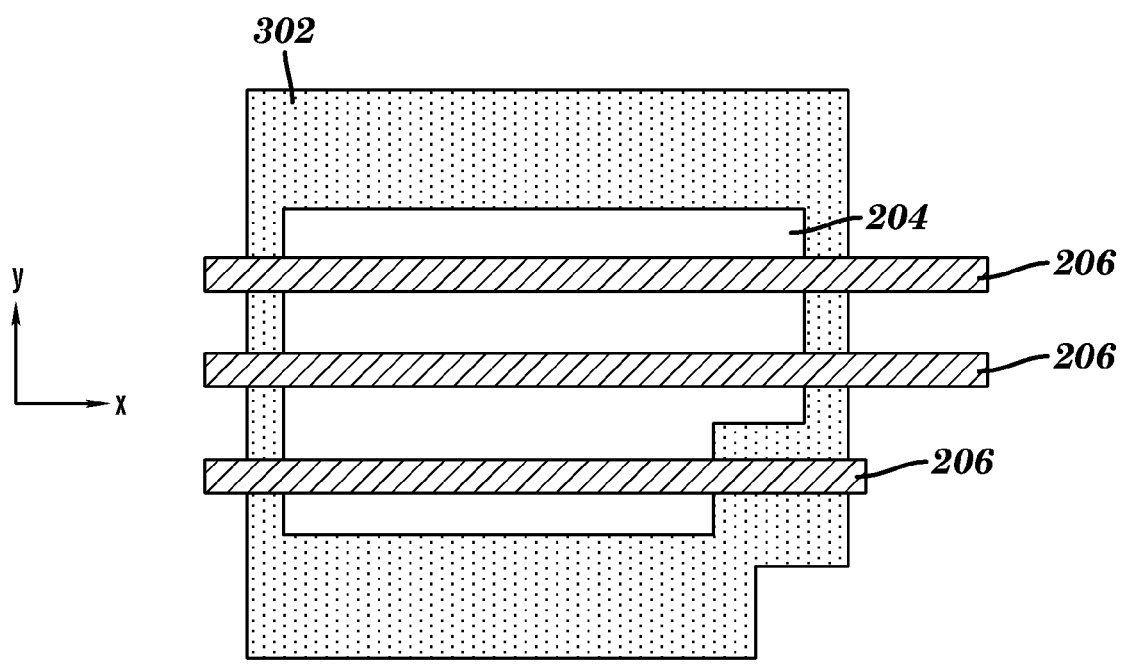
FIG. 3 is a portion of the flattened shapes of the layout of FIG. 2 that have been modified and optimized according to the revised ground ruled defined in accordance with the method illustrated in FIG. 1.
Figure 4:
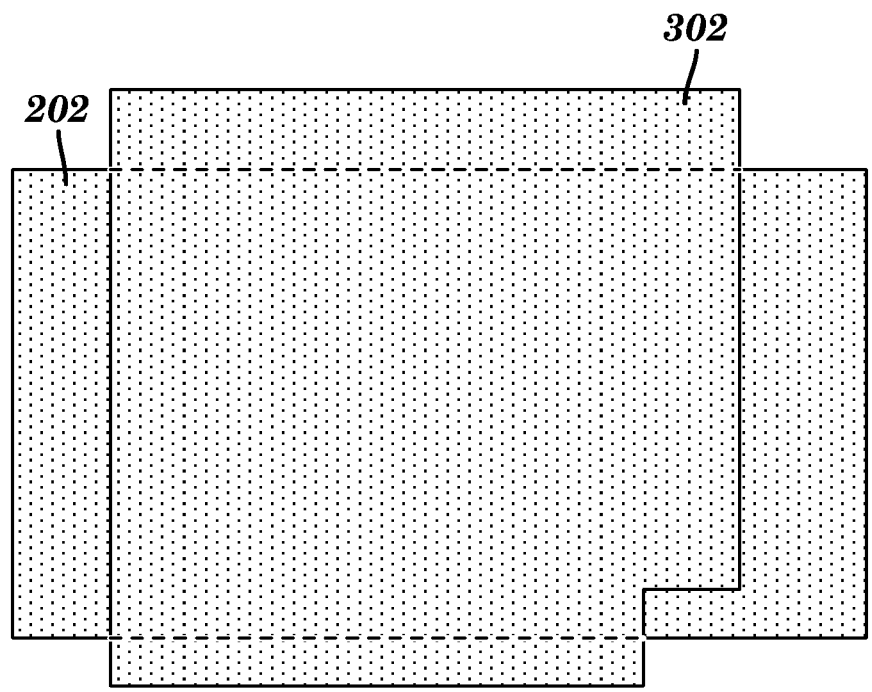
FIG. 4 shows the revised shapes of the layout of FIG. 3 superimposed over the corresponding original shapes of FIG. 2 to illustrate the Boolean operations that result in ADD and HOLE layers.
Figure 5:
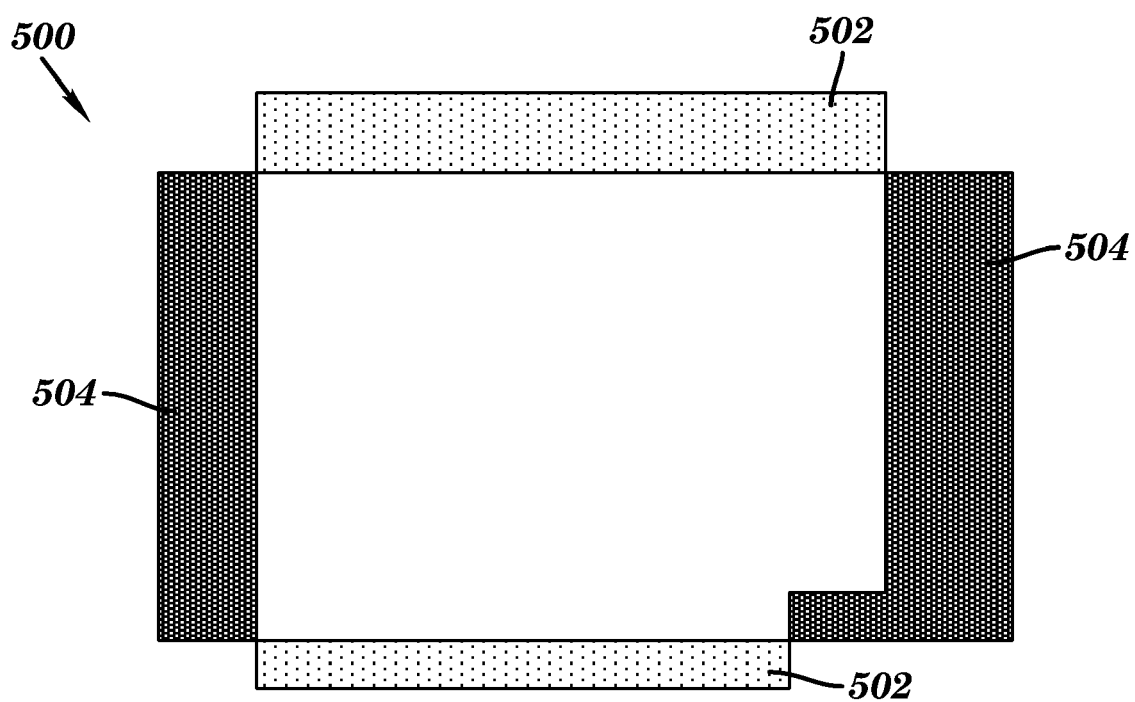
FIG. 5 illustrates a corresponding overlay cell made from the ADD and HOLE shapes in accordance with the method illustrated in FIG. 1.

After flattening of the well region shapes and optimization of the revised layout as described in FIG. 1, the resulting revised well region shape 302 is shown in FIG. 3. As can be seen, shape 302 is reduced in the x-direction with respect to original shape 202 and expanded in the y-direction. Then, FIG. 4 shows the superposition of the revised doped well shape 302 onto the original shape 202, thereby graphically illustrating the Boolean operation for determining the ADD and HOLE layers that will make up the overlay cell. Finally, as shown in FIG. 5, the resulting overlay cell 500 includes the ADD shapes 502 to be added to the original mask, as well as the HOLE shapes 504 to be subtracted from the original mask.

As will be appreciated, a significant advantage of the above described technique is that it allows for maximal design optimization in a non-disruptive fashion by creating an overlay cell that contains late design-cycle changes. The changes are placed on a new layer, which is invisible to existing tools in the design flow, and are used in the creation of selected masks. The performance-based design changes are encoded in the form of design ground rules for target layers. Shapes on the target layer are flattened to create an overlay cell having shapes with the same geometric configuration as the shapes on the target layer in the original design. The new tool optimizes the flattened shapes by enforcing the new ground rules without creating new ground rule violations. The result is an overlay cell, which can be added to the original design.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIG. 1.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of modifying a VLSI layout for yield and/or performance optimization, comprising:

defining a revised set of ground rules for a plurality of original device shapes to be modified, wherein the revised set of ground rules are based on one or more performance and/or yield improvements to be achieved over an existing design;

flattening said plurality of original device shapes to a prime cell once the revised set of ground rules are defined;

performing a layout optimization operation on said flattened device shapes, based on said revised set of ground rules, so as to create a plurality of revised device shapes; and creating an overlay cell from a difference between said revised device shapes and said original device shapes.

2. The method of claim 1, further comprising creating a copy of said original device shapes for facilitating a comparison between said revised device shapes and said original device shapes.

3. The method of claim 2, further comprising generating said difference between revised device shapes and said original device shapes though Boolean difference operations thereon.

4. The method of claim 3, wherein said generating said difference further comprises:
    generating an ADD layer, said ADD layer comprising a difference between said revised device shapes and said original device shapes; and
    generating a HOLE layer said HOLE layer comprising a difference between said original device shapes and said revised device shapes;
    wherein said ADD layer represents shape material to be added by said overlay cell, and said HOLE layer represents shape material to be removed by said overlay cell.

5. The method of claim 4, wherein said overlay cell is created by combining said ADD layer and said HOLE layer.

6. The method of claim 1, wherein the plurality of revised device shapes are transparent to one or more analysis tools used in a design flow.

* * * * *